(12) United States Patent
Saakes et al.

(10) Patent No.: US 6,500,585 B1
(45) Date of Patent: Dec. 31, 2002

(54) METHOD FOR MANUFACTURING A BIPOLAR PLATE

(75) Inventors: Machiel Saakes, Delft; Dick Schmal, Leidschendam; Nitte van Landschoot, Vlaardingen; Willem Johannes Kolkert, Delft, all of (NL)

(73) Assignee: Nederlandse Organisatie voor toegepastnatuurwetenschappelijk onderzoerk TNO, Delft (NL)

( * ) Notice: Subject to any disclaimer, the term of this patent is extended or adjusted under 35 U.S.C. 154(b) by 0 days.

(21) Appl. No.: 09/380,857
(22) PCT Filed: Aug. 13, 1997
(86) PCT No.: PCT/NL97/00463
§ 371 (c)(1), (2), (4) Date: Sep. 8, 1999
(87) PCT Pub. No.: WO98/40920
PCT Pub. Date: Sep. 17, 1998

(30) Foreign Application Priority Data

Mar. 12, 1997 (NL) .............................................. 1005516

(51) Int. Cl.$^7$ ................................................ H01M 2/00
(52) U.S. Cl. ...................................... 429/232; 429/241
(58) Field of Search ............................... 429/225, 231.8, 429/241, 232, 233

(56) References Cited

U.S. PATENT DOCUMENTS

| | | | | |
|---|---|---|---|---|
| 4,353,969 A | * | 10/1982 | Rippel et al. | 429/144 |
| 4,874,681 A | * | 10/1989 | Rippel | 429/210 |
| 5,556,627 A | * | 9/1996 | LaFollette | 429/210 |
| 5,582,622 A | * | 12/1996 | LaFollette | 29/2 |
| 5,585,209 A | * | 12/1996 | Feldstein | 429/210 |
| 5,895,558 A | * | 4/1999 | Spence | 204/164 |
| 5,952,123 A | * | 9/1999 | Hatanaka et al. | 429/217 |

* cited by examiner

Primary Examiner—Gabrielle Brouillette
Assistant Examiner—M. Wills
(74) Attorney, Agent, or Firm—Norris McLaughlin & Marcus, P.A.

(57) ABSTRACT

Described is a method for manufacturing a bipolar plate for, for instance, a bipolar battery. According to the present invention, a negative plate is manufactured by applying a suitable paste in a metal grid, and a positive plate is manufactured by applying a suitable paste in a metal grid. The pasted plates are formed, and arranged on opposite sides of a suitable platelike substrate. The substrate is thermally pressed, then a surface activating treatment is carried out, and thereafter the substrate is lead-plated. That surface activating treatment can be carried out with a corona or, preferably, a plasma. To ensure a good electrical contact, the substrate can be roughened, and the plates can be pressed against the substrate by utilizing a compressed glass fiber mat.

35 Claims, 6 Drawing Sheets

METHOD FOR MANUFACTURING A BIPOLAR PLATE

BACKGROUND OF THE INVENTION

Dutch patent application 10.03340 of older date and of the same inventor as the present application describes a bipolar battery which has improved performance over existing batteries. More particularly, that earlier patent application describes a bipolar plate basically consisting of a suitable substrate provided on either side with active layers, the substrate basically consisting of a graphite felt filled with a plastic. The contents of that earlier application are considered to be incorporated herein by reference.

The earlier application describes two ways of manufacturing a bipolar plate based on the composite substrate described in that earlier application. A first procedure involves the application of a negative pole paste, known per se, to a main surface of the substrate for forming a negative pole layer, and the application of a positive pole paste, known per se, to the opposite main surface of the substrate for forming a positive pole layer. A second procedure, specifically for the purpose of a bipolar plate for use in a lead-acid battery, involves first manufacturing a lead-plated composite substrate, and subsequently activating the lead-plated composite substrate by carrying out the so-called Plante process in a special manner, whereby the substantially massive lead of one surface is converted to a porous lead grid, while the substantially massive lead of the other surface is converted to a porous grid of $PbO_2$.

It has been experimentally established that the first-mentioned process is able to provide batteries having a good performance. It is a problem, however, to implement this process on a commercial scale, because for that purpose special machines must be developed, a practical problem being that the two opposite surfaces of the substrate must be processed in different ways. More particularly, the two pastes must be formed in different ways. Moreover, it is a drawback that in the application of paste to a flat plate, adhesion is not optimal and the capacity is not optimally utilized; to remove this drawback, the substrate would have to be provided with a grid on both sides.

The second process has, as such, good utility for manufacturing a practically applicable bipolar plate. It has been experimentally established, however, that the performance of the thus manufactured batteries, at high rates of discharge (high discharge current intensities), lags behind the performance of batteries manufactured according to the first-mentioned process. Further, it is a problem that in the Plante process described, a strong corrosion occurs of the thin lead films for forming the porous lead, which corrosion is disadvantageous to the substrate.

SUMMARY OF THE INVENTION

The object of the present invention is therefore to provide a method for manufacturing a bipolar plate for, for instance, a bipolar battery, which method can be implemented in a relatively simple and inexpensive manner, while batteries constructed with the thus manufactured bipolar plates have a performance which, in particular at high rates of discharge, is comparable to, or even better than, the performance of known starter batteries.

In starter batteries presently known, use is made not of bipolar plates but of monopolar plates, which are formed as thin, pasted plates. In manufacturing monopolar plates, use can be made of a separate manufacturing machine for positive plates, as well as of a separate manufacturing machine for negative plates, that is, the positive plates and the negative plates are manufactured independently of each other. This provides the advantage that the manufacturing processes used for manufacturing positive plates and for manufacturing negative plates can be optimized independently of each other.

It is customary to manufacture monopolar plates in the form of a metal grid in which a paste is applied, which paste is subsequently formed. During the forming operation, the metal grid serves as a matrix to keep the paste in position. During use, the metal grid serves on the one hand to give the plate mechanical integrity and on the other for current conduction. Because in monopolar plates the current is drawn via a side edge of the plate, which means that the direction of the electric current within the plate is parallel to the plate surface, the metal grid should be of rather heavy design. In a practical example, the grid is constructed in the form of horizontal and vertical bars whose thickness is in the order of a few millimeters, which bars enclose rectangular spaces of about 5×10 $mm^2$, in which spaces the paste is applied. The mass ratio of the paste to the grid is approximately 1:1.

More specifically, therefore, the object of the invention is to provide a method for manufacturing a bipolar plate, as well as a bipolar battery and a method for manufacturing same, in which the advantages of existing techniques are combined as much as possible, while the disadvantages of existing techniques are eliminated as much as possible.

According to an important aspect of the present invention, in a method for manufacturing a bipolar plate, use is made of separately manufactured pasted plates, which are applied to the substrate or pressed onto it. This has the advantage, in the first place, that use can be made of existing techniques for manufacturing pasted plates. However, because in a bipolar plate the current is drawn in a direction perpendicular to the surface, the current conducting properties of the grid of the pasted plates (for current conduction in a direction parallel to the surface) need to meet less stringent requirements. Moreover, the pasted plates are supported over their entire surface by the substrate, so that they do not need to be self-supporting anymore. The above-mentioned two aspects imply that the metal grid of the pasted plates can be considerably less heavy than in the case of monopolar plates, which means that a greater percentage of the weight of the pasted plates can consist of paste, so that the performance per unit of weight improves. A paste-to-grid weight ratio of 3:1 seems realizable without any problems, but even a ratio of 10:1 is envisaged.

A further aspect of the present invention is directed to the provision of a substrate, as well as to the provision of a method for manufacturing a substrate, which substrate is better suited than known substrates to be used in combination with pasted plates placed against it. According to this further aspect of the present invention, the substrate is provided with a lead film, in order to ensure the best possible contact between the substrate on the one hand and the pasted plates on the other. For a good quality of the lead films, it is preferred that the substrate is first thermally pressed, and the thermally pressed substrate is subsequently subjected to a surface activating treatment, whereafter the lead film is applied.

BRIEF DESCRIPTION OF THE DRAWINGS

The above-mentioned aspects and other aspects, features and advantages of the present invention will be clarified by the following description of preferred embodiments of a method according to the invention, with reference to the drawings, in which equal reference numerals denote equal or comparable parts, and wherein:

FIGS. 3A–3C7 illustrates construction details of a battery;

DESCRIPTION OF THE PREFERRED EMBODIMENTS

Figure 1A:
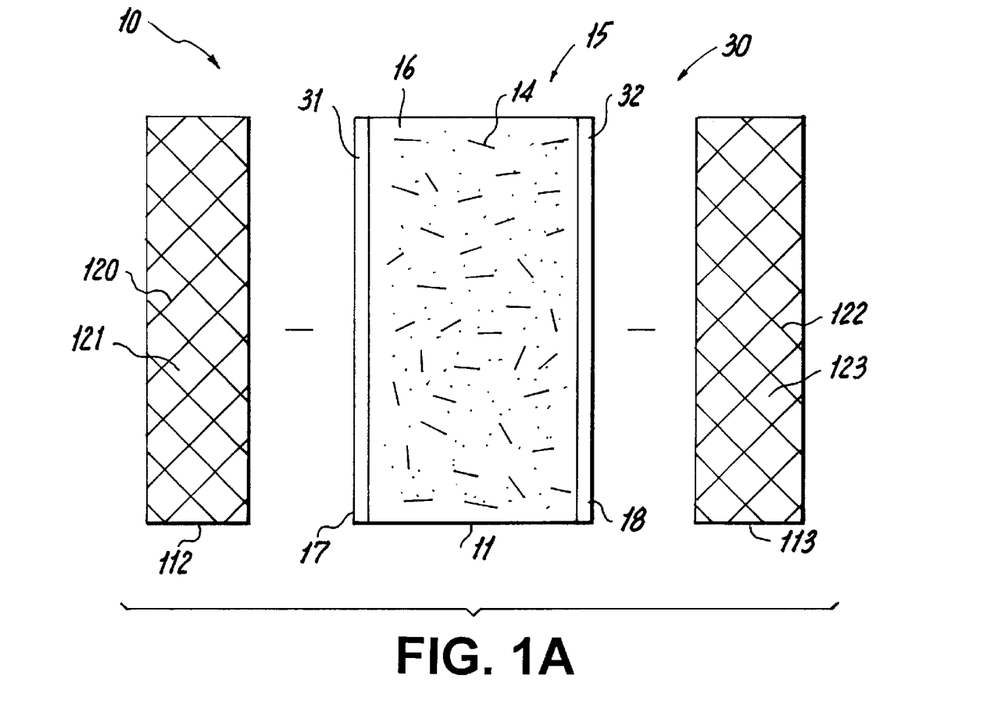
FIGS. 1A–B schematically illustrate different stages of a method for assembling a bipolar battery.

FIG. 1A schematically shows a cross section of the most important three parts of a bipolar plate 10, viz. a platelike substrate 11, a negative plate 112 and a positive plate 113. For clarity, these three parts are drawn as loose parts in FIG. 1A.

The platelike substrate 11 contains a matrix 15 of carbon fibers 14 without preferred direction, which is designated as a non-woven carbon mat or carbon felt. The carbon fibers 14 have a thickness in the order of approximately 8 $\mu$m, and are preferably graphitized, i.e. at least partly, but preferably wholly, converted to graphite. By virtue of the combination of these features, the matrix 15 has a particularly good conductivity in all three spatial directions, in particular in the direction perpendicular to the surface of the platelike substrate 11.

The matrix 15 itself is particularly porous: the porosity is about 95%. The use of this material for a bipolar plate 10 is therefore not obvious. The substrate 11 is to a proper extent liquid-tight, however, in that a plastic material 16 has been applied in the pore spaces of the matrix 15. Preferably, the plastic material 16 is a conductive plastic, so that the electrical conductivity is further improved.

The combination of the matrix 15 of carbon fibers 14 and the plastic material 16 filling the pores of the matrix 15 is also designated as composite substrate. This combination possesses a particularly good mechanical stability.

The composite substrate 11 is a particularly suitable basic material for manufacturing a bipolar plate 10 and can be manufactured as follows. In a first step, a carbon felt is provided. This can be effected, for instance, by making a suspension of carbon fibers in a medium such as water, and subsequently pouring this suspension onto a rotating drum. After evaporation of the medium, the porous carbon felt remains behind on the drum, and that felt possesses intrinsically sufficient strength to be taken off the drum.

In a second step, a thermoplastic plastic, preferably a conductive polymer, is applied in the pores of the carbon felt. This can be effected, for instance, by preparing a solution of a thermoplastic plastic such as fluoelastomer in an organic solvent such as tetrahydrofuran or acetone. For obtaining the desired conductivity of the plastic, it is preferred to add synthetic graphite powder to that solution, whose particles can possess typical dimensions in the range of 1–2 $\mu$m. This suspension is applied to the carbon felt, whereby it is absorbed into the pores of the carbon felt. The solvent can be removed by drying in air (evaporation), but preferably the solvent is removed by drying under reduced pressure (a few millibars) and at elevated temperature (about 80° C.).

In connection with the composite substrate 11, reference can be made, for instance, to the publications WO 96/12313 and JP-61.177.386.

The negative plate 112 comprises a grid 120 and a negative paste 121 applied in the grid 120, which paste 121 is formed. As already mentioned, a known grid is constituted by horizontal and vertical posts. The negative plate 112 can be manufactured identically to monopolar negative pasted plates known per se, with the understanding that the grid 120 can be less heavy than is conventional in monopolar pasted plates. The positive plate 113 comprises a grid 122 and a positive paste 123 applied in the grid 122, which paste 123 is formed. The positive plate 113 can be manufactured identically to monopolar positive pasted plates known per se, with the understanding that the grid 122 can be less heavy than is conventional in monopolar pasted plates. Thus, for the provision of the plates 112 and 113, use can advantageously be made of existing techniques, with the understanding that a grid can be used whose posts can be thinner than in presently known grids, so that the weight ratio of paste to grid can be better than 3:1, and can even be 10:1.

In FIG. 1A, for the sake of clarity, the substrate 11 and the plates 112 and 113 are represented as loose parts. According to an important aspect of the present invention, it is possible to unite the above three parts to form a bipolar plate 10 in a relatively simple manner, viz. by placing the plates 112 and 113, respectively, against the respective main surfaces 17 and 18 of the substrate 11.

For obtaining a good contact between the substrate 11 and the plates 112, 113, the main surfaces 17 and 18 are preferably provided with a metal film 31 and 32, respectively, preferably a lead film, as will be described in more detail later.

Further, it is preferred to ensure that the surfaces 17 and 18 (which may or may not be lead-plated) of the substrate 11 have a certain degree of roughness before the plates 112 and 113 are placed against those surfaces 17 and 18. If the surfaces 17 and 18 are not intrinsically rough to a sufficient extent, for instance because lead-plating has yielded smooth surfaces, those surfaces can be roughened in a separate step. Preferably, the surfaces 17 and 18 have a roughness of at least about 10–20 $\mu$m.

Ensuring the desired roughness can be effected in different ways. After the above-mentioned second step, wherein the thermoplastic plastic is applied in the pores of the carbon felt, the substrate has a certain degree of intrinsic roughness because of the graphite fiber ends projecting from the surface. However, as will be explained in more detail hereinbelow, after the second step (and after drying) the substrate is preferably thermally pressed before the lead film is applied. As a result of thermal pressing, the surface of the substrate is virtually completely flat, as is a metal film applied to it. For providing the desired roughness, that metal film can then be worked, for instance mechanically (for instance by irradiation with pellets of suitable dimensions and hardness: "shot-peening"), electrochemically (for instance by a chemical deposition process in a plating bath) or physically (for instance by spraying with a lead mist for obtaining a porous film, as is known per se, for instance, from U.S. Pat. No. 5,527,642).

Figure 1B:
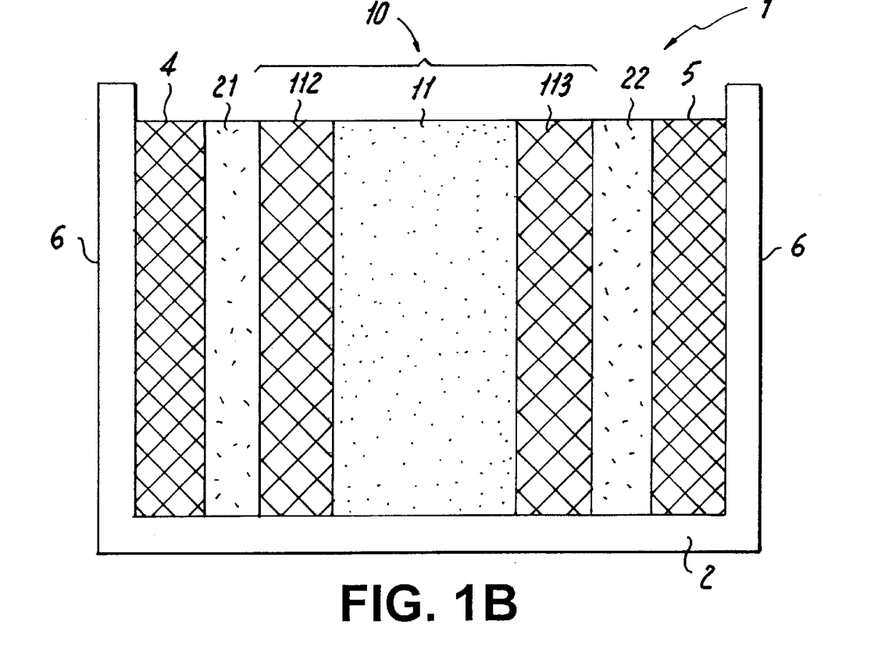

Further, it is preferred to ensure that the plates 112 and 113 be pressed against those surfaces 17 and 18 with a certain force. FIG. 1B shows a schematic cross section of a battery 1, in which the desired extent of pressing-on is automatically provided. The battery 1 comprises a container 2 with sidewalls 6, in which the above-described bipolar plate 10 according to FIG. 1A is placed. Arranged opposite the negative plate 112 is a positive monopolar plate 4, which can be identical to the positive plate 113. Arranged opposite the positive plate 113 is a negative monopolar plate 5, which can be identical to the negative plate 112. Arranged between the negative plate 112 and the positive monopolar plate 4 is a glass fiber separator 21, and arranged between the positive plate 113 and the negative monopolar plate 5 is a glass fiber separator 22, which can be identical to the glass fiber separator 21, which separators 21 and 22 are filled with an electrolyte. The monopolar plates 4 and 5 are (directly or indirectly) supported by the walls 6 of the container 2. The thickness dimensions of the separators 21 and 22 are chosen such that upon placement of the above-mentioned parts in the container 2, those separators 21 and 22 are elastically compressed to a certain extent. Preferably, the extent of compression is about 30 to 35%. Through that elastic compression, the separators 21 and 22 exert to a sufficient extent a press-on force on the plates 112 and 113.

It is also possible to place several bipolar cells in series, as will be described later.

The above-described example involves a physical contact between the substrate 11 and the plates 112 and 113. It is also possible, however, to effect a chemical connection between the substrate 11 and the plates 112 and 113. In a preferred embodiment of the method according to the present invention, this is effected in a relatively simple manner by placing the plates 112 and 113 under a pressure against the substrate 11, directly after the paste 121 and 123 is provided in the grid 120 and 122, that is, before the curing process takes place. The chemical connection between the substrate 11 and the plates 112 and 113 is then created automatically as a result of that curing process.

EXAMPLE

Below follows a description, with reference to FIGS. 2 and 3, of the results of a test arrangement in which the proposals of the present invention were tested utilizing standard available components according to the state of the art, that is, not yet optimized components.

Figure 2:
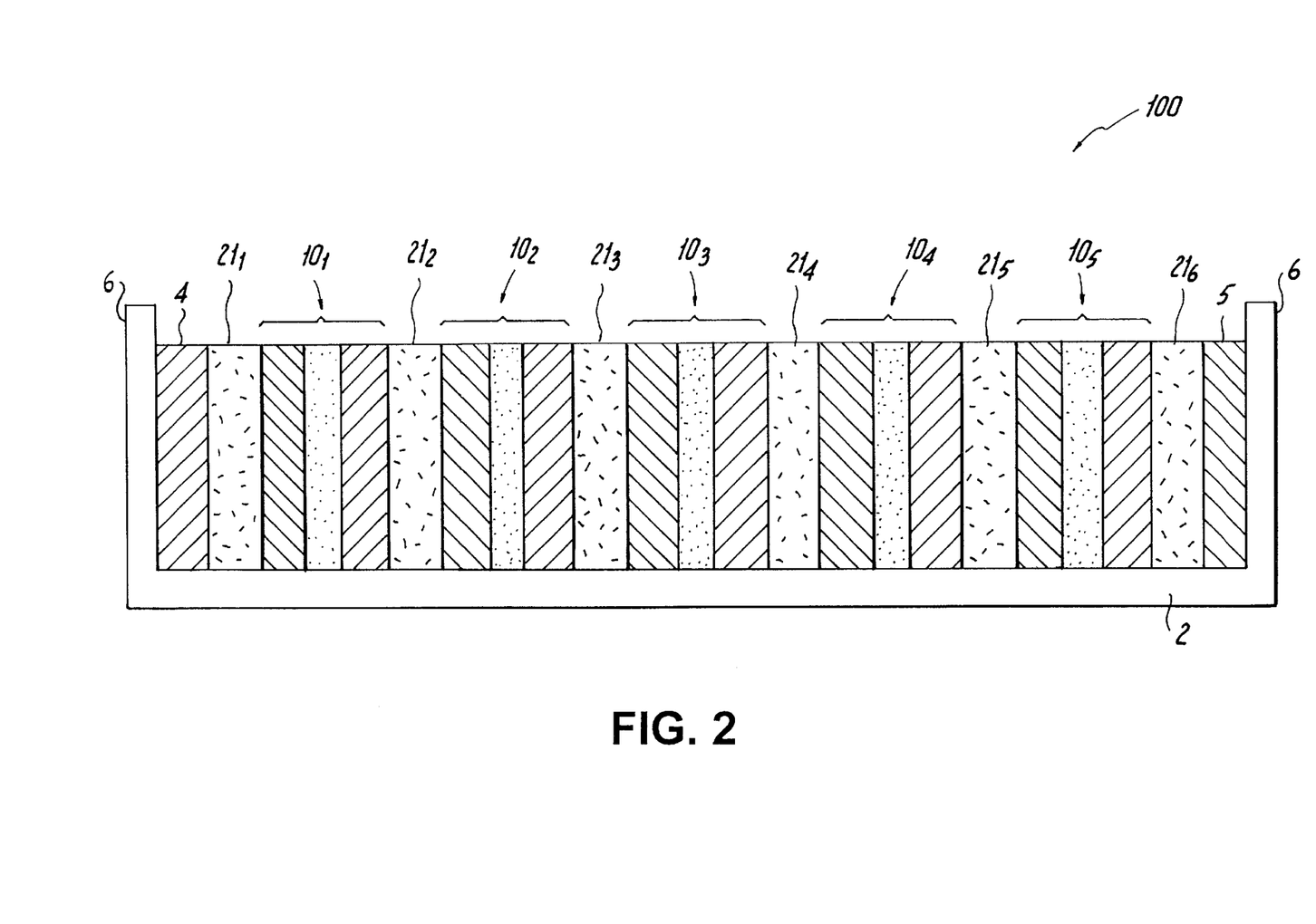
FIG. 2 schematically illustrates a 12V battery manufactured according to the present invention.

In this test, a 12V battery 100 was constructed with the configuration illustrated in FIG. 2. Successively arranged in series in a container 2 were a positive monopolar plate 4, five bipolar plates $10_1$ through $10_5$, and a negative monopolar plate 5. The plates 4, $10_1$ through $10_5$, and 5 were separated from each other by six glass fiber separators $21_1$ through $21_6$. For the negative monopolar plate 5 and the positive monopolar plate 4, use was made of two, priorly formed, conventional starter plates of a thickness of 1.7 mm. The bipolar plates $10_1$ through $10_5$ were mutually identical, and had the structure described with reference to FIGS. 1A–B. In each bipolar plate, use was made of a lead-plated composite substrate 11 as described in the earlier Dutch patent application 10.03340. For the negative plates 112, use was made of priorly formed starter plates that were identical to the negative monopolar plate 5. For the positive plates 113, use was made of priorly formed starter plates that were identical to the positive monopolar plate 4. The six glass fiber separators 211 through 216, prior to compression, each had a thickness of 2×1.17 mm, and they were compressed by about 32% upon placement in the container 2 for assembling the configuration illustrated in FIG. 2.

The effective surface of the plates 4, $10_1$ through $10_5$, and 5 was 47 cm$^2$; the internal resistance of the battery 100, in fully charged condition of the battery, was 0.021 Ohm.

It is noted that for the purpose of drawing current over the entire surface of the monopolar plates 4 and 5, copper end plates had been placed between those monopolar plates 4 and 5 and the corresponding walls 6 of the container 2, but for the sake of simplicity this is not shown in FIG. 2.

The capacity of the thus constructed test battery 100 was measured as a function of the discharge current density. At a specific energy of 5 Wh/kg, the specific power was found to be 500 W/kg. The last-mentioned figures correspond to a discharge time of 36 sec, that is, a C-rate of 100 W/Wh (ratio of specific power/specific energy).

As mentioned, in the described test arrangement, use was made of standard available components, in particular standard available starter plates 4, 5, 112, 113; with these, already a specific power of 500 W/kg was achieved in a simple manner. These standard available starter plates, however, are optimized for their current application, viz. monopolar use, whereby the plates are self-supporting and the current is drawn along an upper edge, for which reason the grids of the plates must be of rather thick and heavy design. This means that optimization for the application proposed by the present invention is possible, and what is specifically envisaged is making the grid of the starter plates lighter. As a result, the performance will improve by two effects. On the one hand, the specific power and the specific energy will increase in that the ratio of paste weight to grid weight increases. On the other, a plate can contain more active paste in that the grid occupies less space.

In a particular embodiment, the present invention proposes manufacturing a pasted plate based on a metal foam, more particularly a lead foam or a lead alloy foam, with the active paste applied in the pore spaces of the foam; in other words: the grid is formed by metal foam. Metal foams are known per se, and have a porosity normally in the order of 96%. A pasted plate manufactured according to this proposal has a particularly favorable ratio of paste weight to total weight.

Another possibility for optimization is the improvement of the electrical contact between the substrate 11 and the starter plates 112 and 113 pressed against it.

By and large, it is expected that the test results mentioned can be improved by at least a factor of 2 through optimization of the components used. From the foregoing, it appears that a practically applicable battery according to the present invention will be attainable because for acceleration purposes for electrical (hybrid) vehicles a minimal specific power of 500 W/kg is a requirement, which is already attainable with the current standard components.

FIG. 3 shows more details of the construction of the tested battery. FIG. 3A shows a schematic perspective view of an exemplary embodiment of a spacer 200; FIG. 3B shows a cross section taken on the line B—B in FIG. 3A; and FIG. 3C shows a longitudinal section of a portion of the battery 100 of FIG. 2.

Figure 3A:
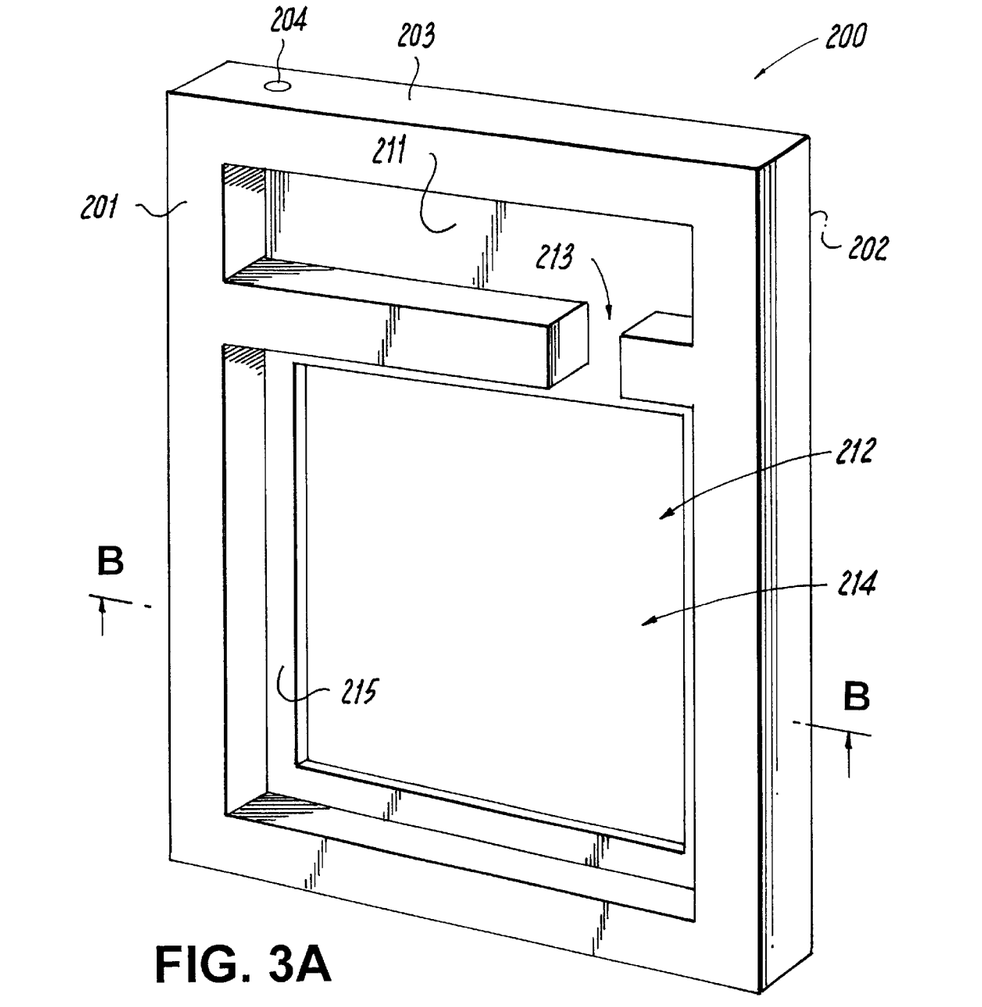

The spacer 200 is made of PE, but a different suitable plastic will also be satisfactory. The spacer 200 is generally in the form of a rectangular block, of a thickness D of about 5 mm, a height of about 13 cm and a width of about 9 cm. In the example shown, the spacer 200 has a first main surface (front face) 201, a second main surface (back face) 202, and a top surface 203. Starting from the first main surface 201, there are provided in the body of the spacer 200, two substantially rectangular recesses 211 and 212, which communicate via a communication recess or passage 213. The two recesses 211 and 212 can be of equal depth, as shown, but that is not requisite.

Figure 3B:
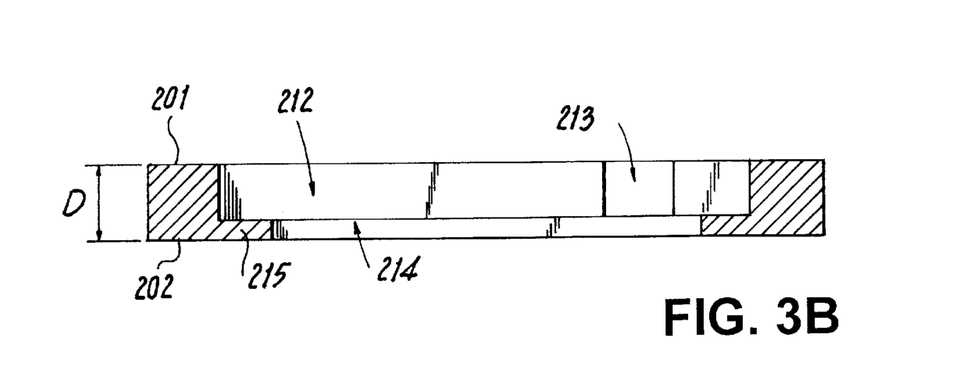

In the bottom of the second recess 212 a substantially rectangular hole 214 is formed, whose dimensions are smaller than those of the second recess 212, and which is substantially centered relative to the second recess 212. The remaining portion of the bottom of the second recess 212 constitutes a framelike supporting edge 215, extending around the rectangular hole 214, of a thickness of about 1.5 mm. In the embodiment tested, the rectangular hole 214 had dimensions of 6×7 cm$^2$, and the dimensions of the second recess 212 were 7×8 cm$^2$, so that the supporting edge 215 had a width of 5 mm. Further, the dimensions of the first recess 211 were about 7×2 cm$^2$.

Figure 3C:
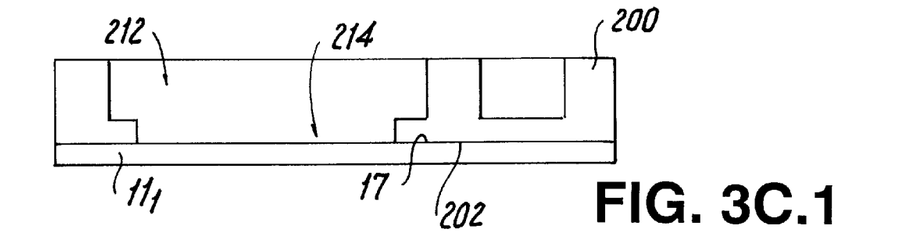

FIG. 3C illustrates the manufacture of a construction unit for a battery. First, on a suitable support (not shown) a first composite substrate $11_1$ is placed, on which in turn the spacer 200 shown in FIGS. 3A–B is placed (FIG. 3C.1). The spacer 200 then has its back face 202 resting on a main surface 17 of the substrate $11_1$.

Figure 3C:
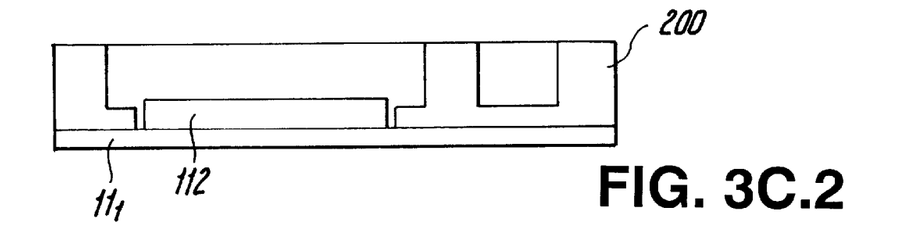

Next, in the hole 214 a pasted plate is positioned, whose dimensions substantially correspond to those of the hole 214, and whose thickness is approximately 1.7 mm (FIG. 3C.2). In the example tested, the pasted plate placed in the hole 214 was a negative pasted plate 112. It will be clear, however, that the pasted plate placed in the hole 214 can also be a positive pasted plate.

Figure 3C:
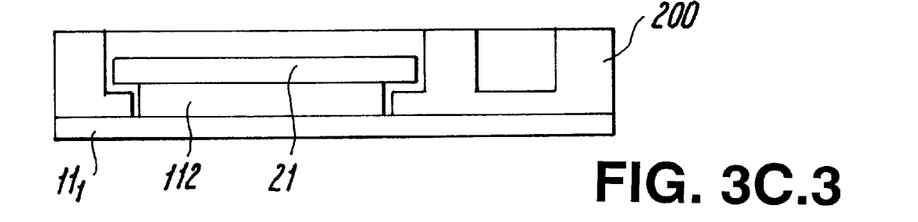

Next, in the second recess 212, a porous, elastic, insulating separator 21 is positioned, whose dimensions substantially correspond to those of the second recess 212 (FIG. 3C.3). In the embodiment tested, for the separator 21, use was made of two superposed sheets of glass fiber mat, each having a thickness of 1.17 mm.

Figure 3C:
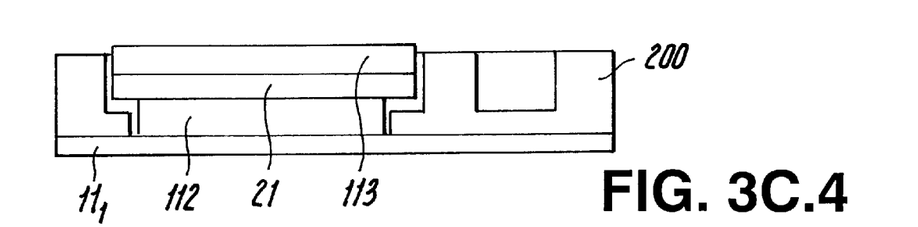

Next, in the second recess 212, on the separator 21, a second pasted plate is positioned, whose dimensions substantially correspond to those of the second recess 212, and whose thickness is approximately 1.7 mm (FIG. 3C.4). Because the first pasted plate is a negative pasted plate, the second pasted plate in the example discussed here is a positive pasted plate 113.

Figure 3C:
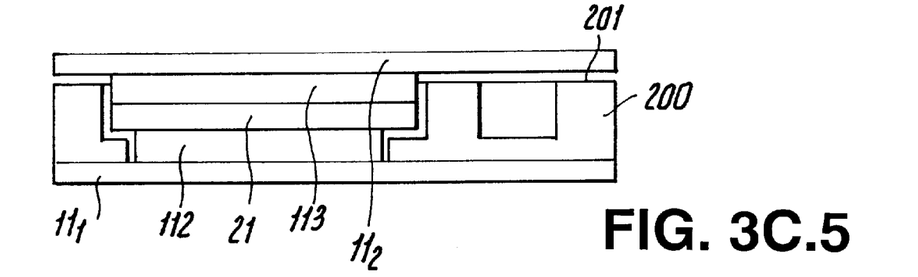

Finally, on the thus formed stack a second composite substrate $11_2$ is placed (FIG. 3C.5). Because the sum of the thicknesses of the pasted plates 112, 113 and the separator 21 (5.74 mm) is greater than the thickness of the spacer 200 (5 mm), the second pasted plate 113 projects beyond the front face 201 of the spacer 200, and the second composite substrate $11_2$ is clear of the spacer 200, as shown.

Figure 3C:
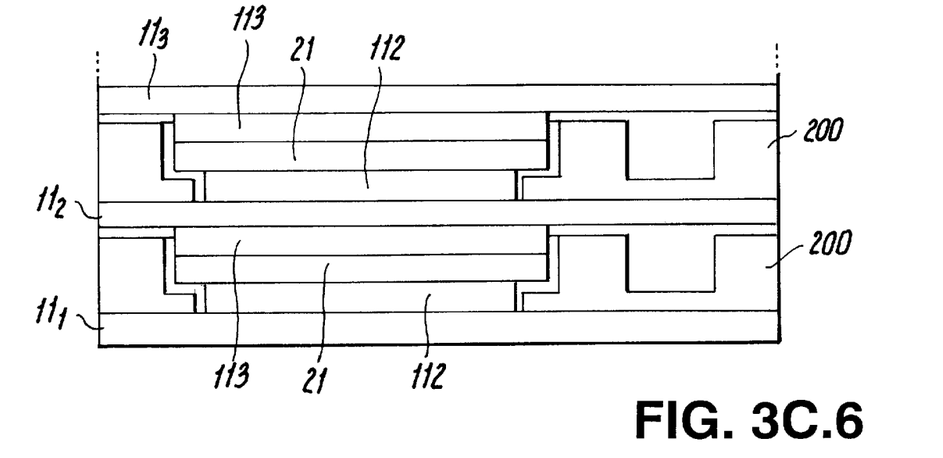

For manufacturing a battery with multiple cells, the above-mentioned process is repeated, whereby a spacer 200 is placed on the second composite substrate $11_2$, etc. (FIG. 3C.6).

When the desired number of cells has been achieved, on the uppermost composite substrate 11 an end plate is placed, which is suitable for fitting a current drawing connection; the end plate can be, for instance, a copper plate. It is noted that such an end plate is also disposed under the lowermost composite substrate, although this is not shown in the figures.

Figure 3C:
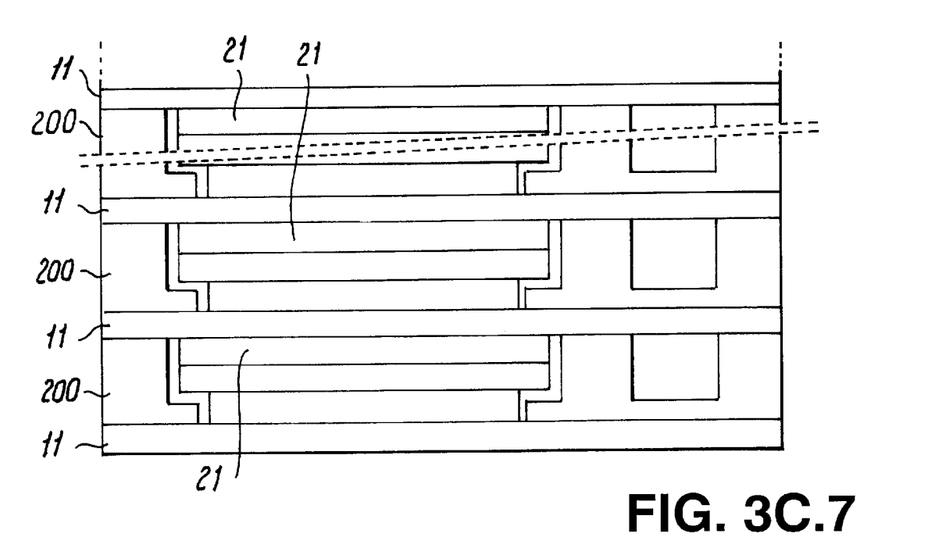

The thus formed package is then compressed, whereby all free space between the substrates 11 and the spacers 200 is eliminated (FIG. 3C.7). The thickness of the separators 21 is thereby reduced from 2.34 mm to 1.6 mm, which amounts to a compression of (2.34–1.6)/2.34=31.6%. In this stage the circumferential edges of the successive spacers 200 and substrates 11 are aligned relative to each other and pressed against each other, and can be joined together for obtaining a liquid-tight joint (sealing). For this purpose, use can be made, for instance, of ultrasonic welding, thermowelding, or other methods which are known per se. The sealing process can be effected, in accordance with the inventive concept of the invention, in a fairly simple manner because the components to be joined together all contain plastic.

The package is now placed in a housing 2, which is at least suitable for taking up a force perpendicular to the surface of the plates. The plates are vertically oriented, with their respective top surfaces 203 facing up. The battery can now be filled with a suitable electrolyte, such as accumulator acid. To that end, in each top surface 203 a filling orifice 204 is formed, which is in communication with the first recess 211. via the filling orifice 204, the first recess 211 and the passage 213, the electrolyte reaches an electrolyte space which is defined by the second recess 212 of the spacer 200 in question. The amount of electrolyte provided in each electrolyte space 212 is such that the liquid level just reaches the passage 213.

During filling, the electrolyte is absorbed into the separator 21, which, as a result, will tend to swell up, so that the pasted plates 112, 113 are subject to a press-on force presses those pasted plates against the adjacent substrates $11_1$, $11_2$. The housing 2 must be able to take up these press-on forces, as well as the forces caused by volume expansion of the active mass at discharge.

It is noted that in the concept discussed, it is virtually impossible for a short-circuit to arise between the pasted plates 112, 113 within a spacer 200. Such a short-circuit, which might in principle occur at the edges of the pasted plates, is avoided in the concept discussed in that the separator 21 is greater than either of the pasted plates (112).

The battery is now basically finished. During use, the electrolyte can warm up and expand, and/or gas bubbles can be formed. To be able to accommodate these phenomena without problems, the first recess 211 functions as an expansion space. To prevent electrolyte from splashing out through the filling orifice 204, the position of the filling orifice is preferably offset relative to the position of the passage 213, as shown. The filling orifice 204 can be closed by securing a plug therein, but it is also possible to place a pressure relief valve (not shown) in the filling orifice 204. Under normal circumstances, that pressure relief valve is closed, so that no electrolyte will evaporate and the battery does not need to be replenished (free of maintenance).

Figure 4:
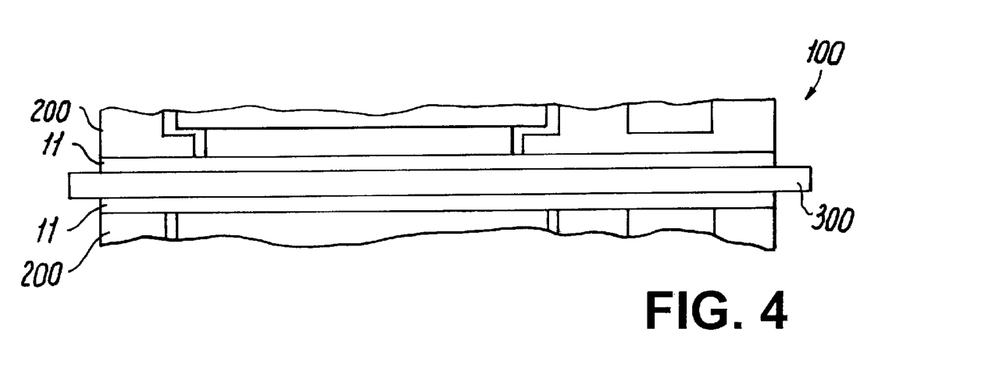
FIG. 4 illustrates a detail of a battery which, according the present invention, is provided with internal cooling.

FIG. 4 shows a detail of a battery 100' which, according to the present invention, is provided with an internal cooling. In a comparable manner to that discussed with reference to FIG. 3, this battery 100' comprises a stack of spacers 200, with substrates 11 between them, while in the spacers 200 a sandwich of pasted plates 112, 113 and a separator 21 is arranged. Arranged at one or more points in the battery 100', between two adjacent spacers 200, is a sandwich of two substrates 11 with an electrically conductive cooling plate 300 between them. The cooling plate 300 can be manufactured, for instance, from aluminum or titanium. In the cooling plate 300, channels (not shown, for clarity) can be provided, in which a cooling medium such as air or preferably water can flow, to dissipate the heat produced in the battery 100'.

Presently, reference is made to FIG. 1A again.

As has been discussed in the foregoing, a bipolar plate 10 according to the present invention is formed by placing monopolar pasted plates 112 and 113 against the main surfaces 17 and 18 of a platelike substrate 11. An important aspect here is that there must a proper contact between the platelike substrate 11 and the pasted plates 112, 113, that is, a lowest possible transition resistance, for which reason the main surfaces 17, 18 of the platelike substrate 11 are preferably metallized, more preferably lead-plated. The reference numeral 11 is used hereinafter for the composite substrate proper, that is, the combination of the carbon fiber felt 14 with the polymer 16, while the lead-plated substrate, that is, the combination of the substrate 11 proper and the lead films 31 and 32, will hereinafter be designated by the reference numeral 30.

The lead films 31 and 32 provide for the proper contact between the platelike substrate 11 and the pasted plates 112 and 113, respectively. A particular aspect of the present invention concerns a method for providing a metal film on the substrate 11, so as to yield a good mechanical and electrical contact between the substrate 11 and that metal film. This aspect of the present invention will hereinafter be explained in more detail for the case of the lead films 31 and 32, but it will be clear that the present invention is not limited to films of lead.

The lead films 31, 32 to be provided on the substrate 11 must satisfy various requirements. For instance, it is desired that each lead film 31, 32 exhibits proper adhesion to the substrate 11; that each lead film 31, 32 is a homogeneous and closed film; and that each lead film 31, 32 is relatively thin. In the prior art, no means are described for realizing these wishes simultaneously. Dutch patent application 10.03340 of older date, mentioned above, describes a method for manufacturing a lead-plated substrate, in which through a galvanic fluorate bath a lead film of approximately 100 $\mu$m is applied to the substrate, whereafter the lead-plated substrate is compressed to allow the fluoelastomer to deliquesce so as to form a continuous whole. A problem here is that the fluopolymer of the substrate has a hydrophobic character, while a metal, in particular lead, is hydrophilic. During lead-plating, the lead therefore deposits preferentially on the carbon fiber ends sticking out of the felt, which, as it were, function as nuclei of deposition, with each nucleus growing into a lead island. During thermal pressing after the galvanic lead-plating, those lead islands are then slightly compressed. Each island exhibits good adhesion to a carbon fiber, and eventually a good adhesion between the lead film and the felt is obtained, because the surfaces of the felt are relatively rough, with, specifically, many carbon fiber ends projecting from the felt during galvanic lead-plating. It proves to be difficult, however, to ensure in such a process that the lead film is fully closed. If the lead film is not fully closed, the underlying material, in particular the graphite, can be affected by corrosion, which limits the practical life of the battery.

One possibility of nonetheless obtaining a closed lead film is to give the lead film a greater thickness. In a test, a lead film of a thickness of 600 $\mu$m was applied to the substrate. While this film proved to be closed, such a great thickness of the lead film has as a disadvantage that the specific electrical performance of a battery manufactured with such a lead-plated substrate (expressed in electrical performance per unit of weight) is relatively low.

The present invention provides a solution to these problems in that in a method according to the present invention the composite substrate 11 is first thermally pressed, and only then lead-plated, with the pressed composite substrate 11 being subjected to a surface activating treatment before the electroplating process is carried out.

In an embodiment which has proved suitable, the composite substrate 11, after the second step of applying and drying the fluoelastomer, was compressed for approximately 10 min at a pressure of about 200 kg/cm$^2$ at a temperature of about 150° C. As a result, the fluoelastomer deliquesces to form a closed whole, that is, a liquid-tight fill-up of the pores of the carbon felt. The pressing temperature was chosen such as to be higher than the melting temperature of the fluoelastomer used, which in this experiment was about 110° C., but lower than the degradation temperature of the fluoelastomer used, which in this experiment was about 400° C.

After the thermal pressing process, the outer surface of the substrate 11 consists substantially completely of fluopolymer 16, which gives that outer surface a hydrophobic character, so that lead would in principle adhere poorly to such an outer surface of the substrate 11. Accordingly, it is not obvious to carry out the thermal pressing prior to lead-plating.

The surface activating treatment mentioned serves to change the hydrophobic character of the outer surface to a hydrophilic character to improve the adhesion of the lead. To that end, the surface activating treatment should be able to modify in a suitable manner the functionality of certain groups of the plastic material, such as CF groups, which determine the hydrophobic character. In the following, two examples of such a surface activating treatment will be discussed.

Figure 5:
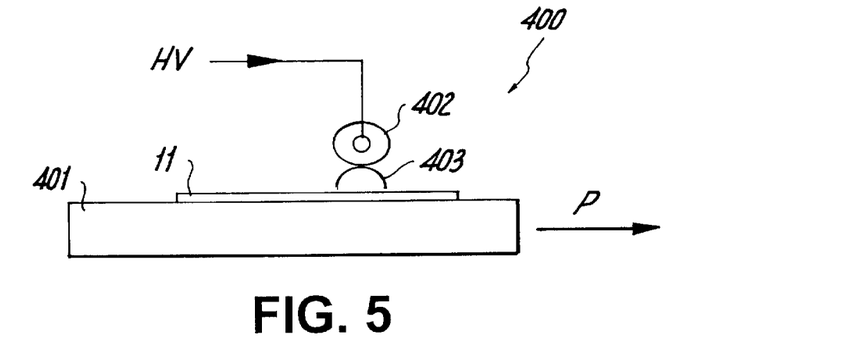
FIG. 5 schematically illustrates an arrangement for carrying out a surface activating treatment using a corona.

A first example of such a surface activating treatment utilizes a corona discharge. An arrangement 400 for carrying out a surface activating treatment using a corona is shown schematically in FIG. 5. On a platform 401 rests a (pressed) substrate 11 to be treated. The platform 401 is movable, as indicated by the arrow P. Arranged above the substrate 11 is a high-voltage electrode 402, which in a test arrangement was in the form of a round cylinder of aluminum oxide, of a length of about 15 cm and a diameter of about 2 cm, having a metal conductor therein. To the high-voltage electrode 402 a high voltage HV is applied, as a result of which a continuous gas discharge 403 is generated, with the platform 401 functioning as counterelectrode. In this gas discharge (corona) 403, particularly reactive oxygen radicals are formed, which "attack" the surface of the substrate 11. In a test, an alternating current of 22 kV was applied to the high-voltage electrode 402, and a discharge of 10 W/cm$^2$ was generated. The gas atmosphere was air, and was blown over the surface of the substrate 11 (compressed air) to supply fresh oxygen and to accomplish a cooling effect. The distance between the sprayer 402 and the substrate 11 to be treated was approximately 1–2 mm. The substrate 11 had been manufactured and pressed in the manner described hereinbefore; the polymer contained 50% graphite powder. The platform 401 was advanced at a speed of 0.5 mm/sec. The thus treated substrate 11, after completion of the corona treatment, was directly subjected to an electroplating operation in a standard fluoborate bath to deposit a lead film 31. Alternatively, for instance a standard lead sulfonic acid bath can be used. The temperature of the plating bath was held at about 22° C. The plating bath was operated in a pulsated fashion: for 30 sec a current of 12.5 mA/cm$^2$ was applied, whereafter for 0.1 sec a current of equal direction but of a strength of 37.5 mA/cm$^2$ was applied. This process was continued for 35 minutes, so that the deposited lead film 31 obtained a thickness of 25 $\mu$m.

Analysis of the formed lead film 31 demonstrated that this lead film 31 exhibited a good homogeneity and was closed virtually completely (better than 99%). This result is considerably better than the result that is achieved if lead-plating occurs before the substrate is thermally pressed: then the lead film is certainly open for tens of percents.

Figure 6:
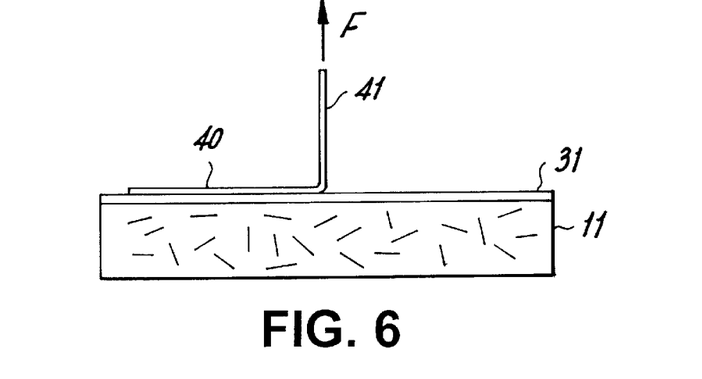
FIG. 6 schematically illustrates a peeling test.

The adhesion of the lead film 31 was tested by means of a peeling test to be discussed hereinafter with reference to FIG. 6. The film endured this test unaffected.

In the peeling test, the lead film 31, after being degreased, had a strip of self-adhesive tape 40 applied to it. An end 41 of this tape 40 was pulled loose, the loose end 41 of the tape 40 making an angle of about 90° with the substrate surface, as outlined in FIG. 6. On the loose end 41 of the tape 40 a tensile force F was exerted, likewise perpendicular to the substrate surface, and thus the tape 40 was pulled loose. The tape 40 used was of the type TESA 4541, and is manufactured by the firm of Beiersdorf AG of Hamburg, Germany. Given a tape width of 5 cm, a tensile force of 566 N was needed to pull the tape 40 off the lead film 31. A lead film 31 which had been applied to a surface treated according to the present invention endured the peeling test unaffected, which is meant to say that no parts of the lead film 31 stuck to the tape. For comparison: when a substrate was lead-plated without the above-described surface treatment, in a peeling test large portions of the lead film (more than 50%) were pulled off the substrate.

A second example of a suitable surface activating treatment utilizes a plasma. An arrangement 500 for carrying out a surface activating treatment using a plasma is shown schematically in FIG. 7. In a treatment chamber 510, a (pressed) substrate 11 to be treated rests on a support 501. The chamber 510 is provided with a vacuum pump 511 to evacuate the atmosphere from the chamber 510, and with a gas inlet connection 512 to which a gas cylinder can be connected to set an atmosphere of a desired pressure and composition in the chamber 510. The chamber 510 is provided with means 520 for generating electromagnetic radiation of a frequency of 2450 MHz and a power of 600 W (comparable to microwave oven radiation), so that the gas in the chamber 510 ionizes, at least in the proximity of the substrate 11. Since such means 520 are known per se, they will not be discussed further. In a practical test, in the chamber 510 a gas atmosphere was set, of a pressure of approximately 1 mbar, and a composition of substantially 95% $O_2$ and 5% $CF_4$. The substrate 11 had been manufactured and pressed in the manner described hereinbefore; the polymer contained 50% graphite powder. The substrate 11 was exposed to the formed plasma for 2 minutes. Thereafter, in a manner comparable to that discussed earlier, in an electroplating bath a lead film 31 of a thickness of about 25 $\mu$m was applied. This lead film 31 was found to be completely (100%) closed, to have a good homogeneity, and to endure the above-mentioned peeling test unaffected.

Both surface activating methods have their own merits.

An important advantage of the corona method is that the necessary equipment is relatively simple and relatively inexpensive. Further, the corona has a corrosive action, so that a microroughness is caused.

Figure 7:
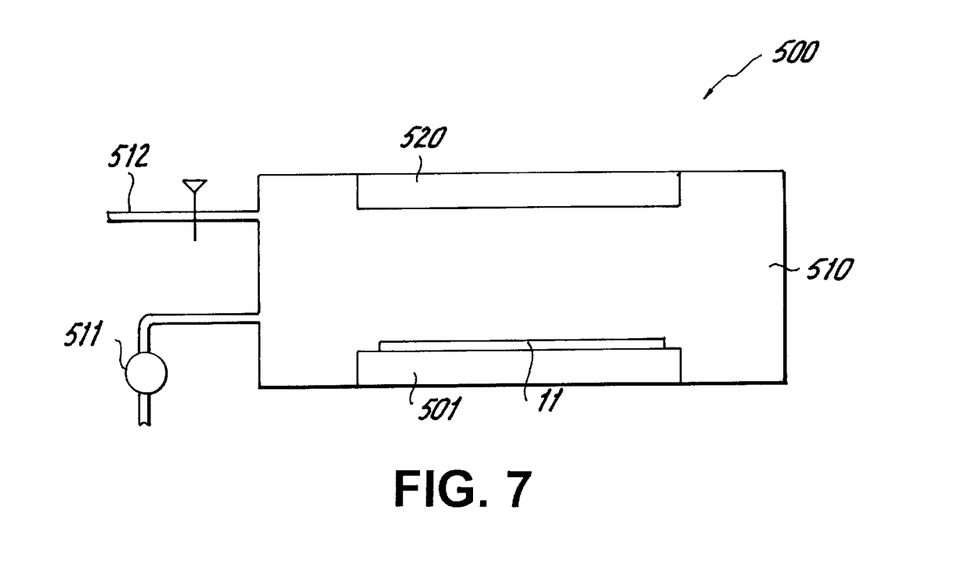
FIG. 7 schematically illustrates an arrangement for carrying out a surface activating treatment using a plasma.

The plasma method, however, has many advantages over the corona method. One advantage to be mentioned is that the plasma method is intrinsically safe in that no high electrical voltages are needed. Process-technical advantages of the plasma method include:
  the chamber 510 is closed off during the treatment, so that atmospheric contamination is precluded and the reproducibility of the process is high;
  the process time is fairly short;
  the energy consumption is relatively low;
  the process enables a batchwise treatment which links up well with the batchwise pressing process of the substrates;
  the treatment is not limited to flat surfaces.

Although a corona process, as such, has the advantage of simplicity, it being possible to carry out the process in "ordinary" ambient air, the end result achieved (lead-plated substrate) has a better quality in a plasma process, viz. a 100% coverage of the lead film. It has been found that the lead film, after activation by a corona process, has a microporosity which is imputed to dust particles in the air. Although this microporosity is very slight (less than 1%), it can still mean a reduction of the life of a battery. It is expected that such microporosity can be avoided by filtering the air to be used in the corona process, but the required filtering equipment then detracts from the above-mentioned simplicity of the corona process.

By contrast, the use of a closed chamber in the plasma process provides the advantage that the composition of the gas atmosphere used can be accurately set. In the example discussed, $CF_4$ has been added to the gas. It has been found that, as a consequence, the activation of a plasma process is effective for many months, probably even more than a year after the treatment. The activation of a corona process is found to be effective up to about 50 hours after the treatment. This can be an important datum if it is desired not to perform the plating treatment immediately after the activation treatment, but to allow some time to elapse between the two operations, for instance because the activation on the one hand and the plating on the other take place at geographically separate locations.

It is not possible to use $CF_4$ in a corona process because the corona process occurs under atmospheric conditions, and the $CF_4$ is particularly reactive.

It is noted, in passing, that the use of $CF_4$ in the plasma process is not requisite. When using a 100% $O_2$ atmosphere, however, the activation achieved will be effective only for a limited time (about 50 hours).

In view of the above-mentioned advantages, activation through a plasma is preferred, in particular because then the lead films 31, 32 are closed with certainty, which accordingly affords a better protection to the graphite present in the substrate 11. As a consequence, it is also possible to select the concentration of the graphite in the substrate 11 to be higher. Defined as a parameter here is the weight of the graphite powder as a percentage of the weight of the polymer powder in the solvent (during an experiment, 100 grams of polymer powder were dissolved in 500 ml acetone). Tests were done at graphite concentrations of 40%, 50% and 60%, which invariably yielded good results; higher percentages seem to be possible too.

The advantage of such high percentages is twofold. In the first place, the graphite powder contributes to the conductivity of the substrate: in a test with substrates whose graphite concentrations were 40% and 50%, a surface specific resistance of about 0.04 $\Omega cm^2$ was measured, while in a test with a substrate whose graphite concentration was 60%, a surface specific resistance of about 0.02 $\Omega cm^2$ was measured. In the second place, graphite particles which, after the thermal pressing, are located adjacent the surface, can function as nucleation sites for the lead deposition process. The more of such nucleation sites the substrate has, the easier it is to form a completely closed lead film.

In a preferred embodiment, a substrate 30 lead-plated according to the present invention has two lead films 31, 32 of mutually different thicknesses. For instance, the thickness of one lead film 31 is about 40 $\mu$m, while the thickness of the other lead film 32 is approximately 20 $\mu$m. The thicker film 31 will be positive in the later battery, and will be anodically attacked by the electrolyte, while the thinner film 32 will be negative in the later battery, and will be cathodically protected by the electrolyte.

In this connection, it is noted that the thickness of the lead films 31, 32 is a compromise between life (a greater thickness gives a longer life) and specific performance (a greater thickness means a greater non-productive weight).

EXAMPLE

By way of test example, a 4V bipolar battery 1 was constructed, having the configuration illustrated in FIG. 1B. In a container 2, successively a positive monopolar plate 4, a bipolar plate 10, and a negative monopolar plate 5 were arranged in series, and those plates 4, 10, and 5 were separated from each other by two glass fiber separators 21 and 22. For the negative monopolar plate 5 and the positive monopolar plate 4, use was made of two pre-formed conventional starter plates of a thickness of 1.7 mm. The bipolar plate 10 had the structure discussed with reference to FIG. 1A. The bipolar plate 10 comprised a lead-plated composite substrate 30, the lead films 31 and 32 having a thickness of approximately 25 μm. For the negative plate 112, use was made of a pre-formed starter plate which was identical to the negative monopolar plate 5. For the positive plate 113, use was made of a pre-formed starter plate which was identical to the positive monopolar plate 4. The two glass fiber separators 21 and 22, prior to compression, each had a thickness of 2.34 mm, and they were compressed by approximately 32% upon placement in the container 2 for assembling the configuration illustrated in FIG. 1B.

The effective surface of the plates 4, 10 and 5 was approximately 40 cm$^2$; the internal resistance of the (fully charged) battery 1 was approximately 0.02 Ohm.

The capacity of the thus constructed test battery 1 was measured as a function of the discharge current density. The results are shown in the table of Appendix I. At a specific energy of 5 Wh/kg, the specific power was found to be 500 W/kg. The last-mentioned figures correspond to a discharge time of 36 sec, that is, a C-rate of 100 W/Wh (ratio of specific power/specific energy).

It has thus been demonstrated that the present invention provides a substrate having superior properties, which enables manufacture of a bipolar plate of superior performance. In the tests discussed, the substrate provided by the invention was combined with standard available starter plates 4, 5, 112, 113; with these, already a specific power of 500 W/kg was achieved in a simple manner. These standard available starter plates, however, are optimized for their current application, viz. monopolar use, where the plates are self-supporting and the current is drawn along an upper edge, for which reason the grids of the plates must be of rather thick and heavy design. By the use of plates in which the grid is less heavy, the performance per unit of weight will increase greatly.

It will be clear to those skilled in the art that the scope of protection of the present invention as defined by the claims is not limited to the embodiments represented in the drawings and discussed, but that it is possible to alter or modify the represented embodiments of the method according to the invention within the scope of the concept of the invention. Thus, for instance, the specified dimensions of the components of the battery are not critical.

Further, a bipolar plate is not exclusively suitable for use in a bipolar battery. The bipolar plate can also be used, for instance, in a bipolar condenser or a fuel cell, where it provides the same advantages as discussed in the foregoing.

APPENDIX I

| Idisch \|A\| | i \|A/cm$^2$\| | pulses 70 ms | t (disch. \|s\| | Qdisch \|Ah\| | \<Vdisch\> | W | Wh | Wh/kg | W/kg |
|---|---|---|---|---|---|---|---|---|---|
| 4 | 0.1 | 11650 | 815.5 | 0.894 | 3.50 | 14 | 3.13 | 21.5 | 96 |
| 8 | 0.2 | 3960 | 277.2 | 0.616 | 3.50 | 28 | 2.16 | 14.8 | 192 |
| 16 | 0.4 | 1050 | 73.5 | 0.327 | 3.50 | 56 | 1.14 | 7.8 | 384 |
| 24 | 0.6 | 500 | 35.0 | 0.233 | 3.20 | 77 | 0.75 | 4.8 | 527 |
| 32 | 0.8 | 276 | 19.3 | 0.172 | 3.10 | 99 | 0.53 | 3.7 | 680 |
| 40 | 1.0 | 190 | 13.3 | 0.148 | 2.85 | 114 | 0.42 | 2.9 | 782 |
| 48 | 1.2 | 117 | 8.2 | 0.109 | 2.80 | 134 | 0.31 | 2.1 | 922 |
| 56 | 1.4 | 84 | 5.9 | 0.091 | 2.50 | 140 | 0.23 | 1.6 | 960 |
| 64 | 1.6 | 60 | 4.2 | 0.070 | 2.30 | 147 | 0.16 | 1.1 | 1008 |

What is claimed is:

1. A method for manufacturing a metallized composite substrate (30) suitable for use in a bipolar plate (10) comprising the steps of:

providing a composite substrate (11) in the form of a plate, with main surfaces (17,18) in the form of electrically conducting carrier material (15);

applying a thermoplastic plastic material (16) in the pore spaces of the matrix;

subjecting the combination of the carrier material (15) and the thermoplastic material (16) to a thermal pressing process;

subjecting the main surfaces (17,18) of the combination of the carrier material (15) and the thermoplastic material (16) to surface activating treatment, and thereafter applying a metal film (31,32) to the main surfaces (17,18) of the substrate;

wherein the carrier material is formed by a matrix of a carbon fiber structure which is electrically conductive in all directions and which carbon fibers are graphitized; and performing the surface activating treatment in a dry condition.

2. A method according to claim 1, wherein the surface activating treatment is performed utilizing a plasma, generated in an atmosphere of substantially oxygen, at a pressure of about 1–2 mbar.

3. A method according to claim 2, wherein $CF_4$ is added to the atmosphere.

4. A method according to claim 1, wherein graphite powder is added to the plastic material in an amount, based on weight, which is more than 20% of the amount of plastic material (16).

5. A method according to claim 1, wherein it is ensured that the main surfaces (17,18) of the metallized composite substrate (30) have a degree of roughness of at least about 10–20 μm.

6. A metallized composite substrate (30), suitable for use in a bipolar plate (10), comprising a matrix (15) of carrier material, electrically conducting in all directions, said carrier comprising graphitized carbon fibers (14), with a mixture of thermoplastic plastic material (16) and graphite powder applied in the pore spaces of the matrix (15), and the amount of graphite powder in the thermoplastic plastic material (16) being at least 20% metal films (31,32) applied to the main surfaces (17,18) of the composite substrate (30), the thickness of the metal films (31,32) being 100 μm at a maximum;

the metal film (31,32) being substantially homogeneous and completely closed;

the specific surface resistance being better than about 0.05 $\Omega cm^2$;

and wherein the mechanical adhesion of the metal films (31,32) to the main surfaces (17,18) of the composite substrate (30) is such that they endure unaffected a peeling test with an adhesive strip (40) whose adhesive strength is 113 N per cm of strip width, in which peeling test a loose end portion (41) of that adhesive strip (40) is subjected to a force (F) in a direction perpendicular to the surface.

7. A metallized composite substrate according to claim 6, wherein the thickness of a first metal film (31) is approximately 40 μm and the thickness of a second metal film (32) is approximately 20 μm.

8. A method for manufacturing a bipolar plate (10), comprising the steps of:

manufacturing a substrate (11;30) by providing a composite substrate (11) in the form of a plate, with main surfaces (17,18) in the form of electrically conducting carrier material (15);

applying a thermoplastic plastic material (16) in the pore spaces of the matrix;

subjecting the combination of the carrier material (15) and the thermoplastic material (16) to a thermal pressing process;

subjecting the main surfaces (17,18) of the combination of the carrier material (15) and the thermoplastic material (16) to surface activating treatment, and thereafter applying a metal film (31,32) to the main surfaces (17,18) of the substrate;

wherein the carrier material is formed by a matrix of a carbon fibre structure which is electrically conductive in all directions and which carbon fibres are graphitized; and performing the surface activating treatment in a dry condition;

manufacturing a negative pasted plate (112) by providing a suitable paste (121) in a metal grid (120);

manufacturing a positive pasted plate (113) by providing a suitable paste (123) in a metal grid (122);

and fitting the two pasted plates (112, 113) on opposite sides against the substrate (11), such that electrically conducting contacts are effected between the facing main surface of the substrate and the respective pasted plates.

9. A method according to claim 8, wherein it is ensured that the pasted plates (112, 113) are pressed against the main surfaces (17, 18) by locking the plates (112, 113) between two compressed glass fiber mats (21).

10. A method according to claim 8, wherein a chemical connection between the plates (112, 113) and the respective surfaces (17, 18) of the substrate (11; 30) is effected.

11. A method according to claim 8, wherein said chemical connection is effected by fitting the plates (112, 113) against the substrate (11; 30) directly after the paste (121, 123) has been provided in the respective grid (120, 122), and allowing the curing process to take place after the plates (112, 113) have been fitted against the substrate (11; 30).

12. A method according to claim 8, wherein the metal grid (120, 122) is a metal foam.

13. A bipolar plate (10) comprising:

a metallized composite substrate (30) comprising a matrix (15) of carrier material, electrically conducting in all directions, said carrier comprising graphitized carbon fibers (14), with a mixture of thermoplastic plastic material (16) and graphite powder applied in the pore spaces of the matrix (15), and the amount of graphite powder in the thermoplastic plastic material (16) being at least 20%;

metal films (31,32) applied to the main surfaces (17,18) of the composite substrate (30), the thickness of the metal films (31,32) being 100 μm at a maximum;

the metal film (31,32) being substantially homogeneous and completely closed;

the specific surface resistance being better than about 0.05 $\Omega cm^2$;

and wherein the mechanical adhesion of the metal films (31,32) to the main surfaces (17,18) of the composite substrate (30) is such that they endure unaffected a peeling test with an adhesive strip (40) whose adhesive strength is 113 N per cm of strip width, in which peeling test a loose end portion (41) of that adhesive strip (40) is subjected to a force (F) in a direction perpendicular to the surface;

a negative pasted plate (112) arranged against the first main surface (17) of the composite substrate (30), which comprises a metal grid (120) and a paste (121) provided therein;

a positive pasted plate (113) arranged against the second main surface (18) of the composite substrate (30), which comprises a metal grid (122) and a paste (123) provided therein.

14. A method for manufacturing a bipolar battery, wherein there are arranged in a container (2) a series of (a) a monopolar positive pasted plate (4), (b) at least one bipolar system (10), which comprises in succession a negative plate (112), a metallized composite substrate (30), and a positive plate (113), and (c) a monopolar negative pasted plate (5), and wherein between the monopolar positive pasted plate (4) and the adjacent bipolar system (10), between the monopolar negative pasted plate (5) and the adjacent bipolar system (10), and between the bipolar systems (10) mutually, if more than one is present, a glass fiber separator (21) is positioned, which is filled with a suitable electrolyte, the thickness of the glass fiber separators (21) being chosen such that, after being positioned, they are compressed by about 30–35%.

15. A method according to claim 14, wherein the monopolar negative pasted plate (5) is identical to the negative plate (112) of the bipolar system (10), and wherein the monopolar positive pasted plate (4) is identical to the positive plate (113) of the bipolar system.

16. A method according to claim 14, wherein a stack of, successively, a first pasted plate (112), a separator (21), and a second pasted plate (113), is provided in a recess (214, 212) in a frame like plastic spacer (200).

17. A method according to claim 16, wherein the thickness of said stack is greater than the thickness of the spacer.

18. A method according to claim 16, wherein between successive spacers (200) at least one substrate (11; 30) is provided.

19. A method according to claim 18, wherein the dimensions of the substrates (11; 30) are substantially equal to those of the spacers (200).

20. A method according to claim 19, wherein the series of spacers (200) and substrates (11; 30) is compressed to contact the spacers (200) and the substrates (11; 30) with each other, whereby the separators (21) undergo a compression of preferably about 30 to 35%, and whereby the circumferential edges of the spacers (200) and the substrates (11) are joined together in liquid-tight manner.

21. A method according to claim 18, wherein between successive spacers (200) two substrates (11; 30) are arranged, and wherein between those two successive substrates (11; 30) a cooling element (300) is arranged.

22. A bipolar battery (1; 100), manufactured by a method wherein there are arranged in a container (2) a series of (a) a monopolar positive pasted plate (4), (b) at least one bipolar system (10), which comprises in succession a negative plate (112), a metallized composite substrate (30), and a positive plate (113), and (c) a monopolar negative pasted plate (5), and wherein between the monopolar positive pasted plate (4) and the adjacent bipolar system (10), between the monopolar negative pasted plate (5) and the adjacent bipolar system (10), and between the bipolar systems (10) mutually, if more than one is present, a glass fiber separator (21) is positioned, which is filled with a suitable electrolyte, the thickness of the glass fiber separators (21) being chosen such that, after being positioned, they are compressed by about 30–35%, wherein at least a specific energy of 5 W/kg, the specific power is at least about 500 W/kg.

23. The method of claim 1, wherein the composite substrate is suitable for use in a bipolar battery.

24. The method of claim 1, wherein the metal film is a lead film.

25. The method of claim 1, wherein the surface activating treatment is performed by utilizing a corona discharge or a plasma.

26. The method according to claim 3, wherein $CF_4$ is added in an amount of about 5%.

27. The method according to claim 4, wherein the graphite powder comprises at least 40% of the amount of plastic material.

28. The method according to claim 27, wherein the graphite powder comprises at least 60% of the amount of plastic material.

29. The substrate of claim 6, wherein the graphite powder comprises at least 40% of the amount of plastic material.

30. The substrate of claim 29, wherein the graphite powder comprises at least 50% of the amount of plastic material.

31. The substrate of claim 6, wherein the metal films are lead films.

32. The substrate of claim 6, wherein the thickness of the metal films is 40 $\mu$m at maximum.

33. The substrate of claim 6, wherein the specific surface resistance is greater than about 1.025 $\Omega cm^2$.

34. The method according to claim 12, wherein the metal foam is a lead foam or a lead alloy foam.

35. The method according to claim 16, wherein the separator is manufactured from glass fiber.

* * * * *

UNITED STATES PATENT AND TRADEMARK OFFICE
CERTIFICATE OF CORRECTION

PATENT NO. : 6,500,585 B1
DATED : December 31, 2002
INVENTOR(S) : Machiel Saakes et al.

It is certified that error appears in the above-identified patent and that said Letters Patent is hereby corrected as shown below:

<u>Title page,</u>
Item [73], Assignee, please delete the caption and insert the following:
-- Nederlandse Organisatie voor toegepast-natuurwetenschappelijk onderzoek TNO, Delft (NL) --

Signed and Sealed this

Sixteenth Day of September, 2003

JAMES E. ROGAN
*Director of the United States Patent and Trademark Office*